Dec. 28, 1937.                G. ALGARSSON                2,103,740
              AIR SCREW BLADE PITCH CONTROLLING MECHANISM
                        Filed April 23, 1936
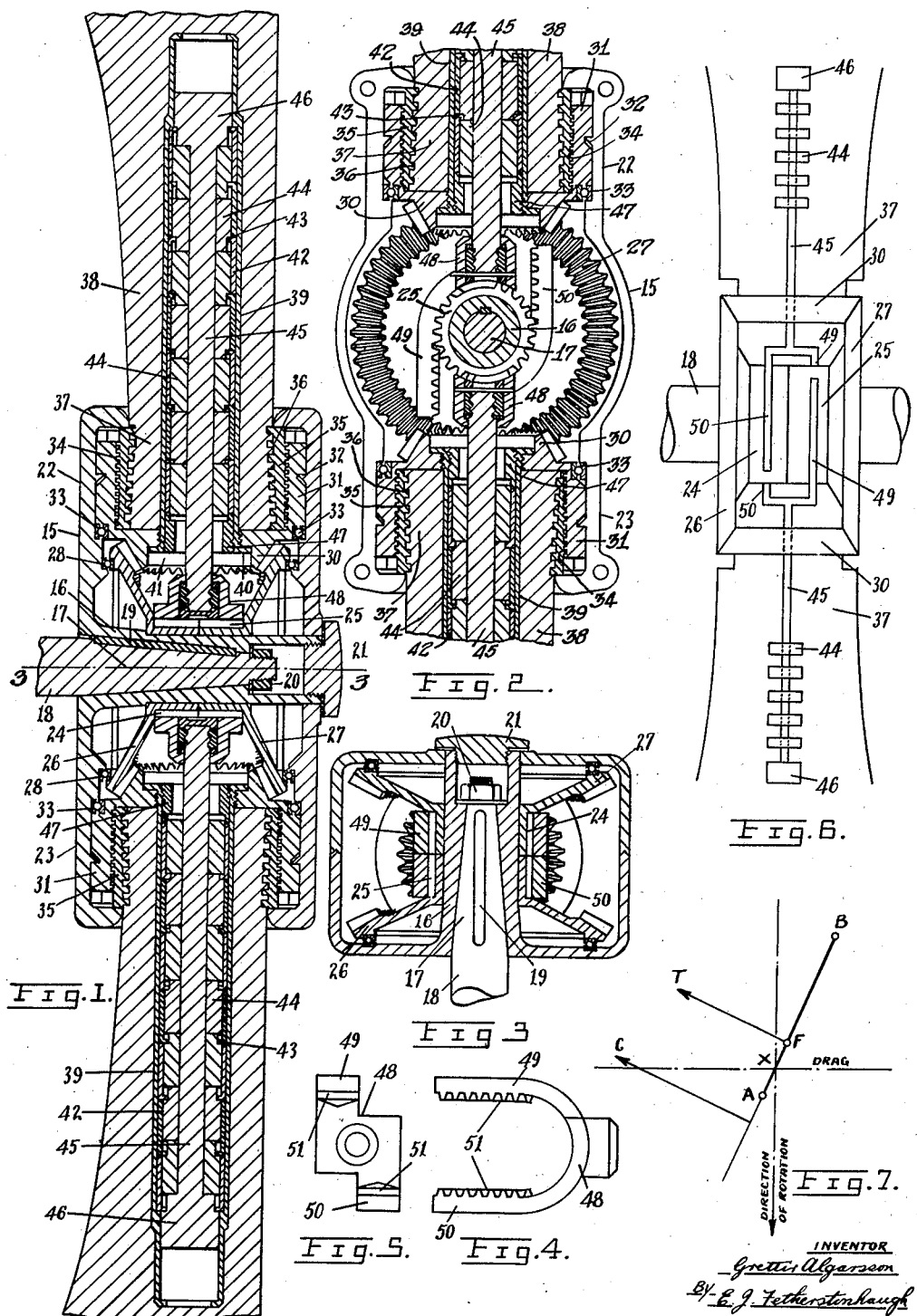

Patented Dec. 28, 1937

2,103,740

UNITED STATES PATENT OFFICE 2,103,740

AIR SCREW BLADE PITCH CONTROLLING MECHANISM

Grettir Algarsson, Montreal, Quebec, Canada, assignor to Hartland de Montarville Molson, Montreal, Quebec, Canada Application April 23, 1936, Serial No. 75,961

14 Claims. (Cl. 170—162)

The invention relates to an airscrew blade pitch controlling mechanism as described in the present specification and illustrated in the accompanying drawing that form part of the same.

The invention consists essentially of the utilization of centrifugal force of graduated mass in controlling pitch setting mechanism in airscrews whereby predetermined force may be transmitted under varying conditions of airspeed, altitude, load etc., as pointed out in the claims for novelty following a description in detail of an acceptable form of the invention.

The objects of the invention are the provision of automatic means whereby the blades of an airscrew will assume a pitch position in equilibrium between R. P. M. and aerodynamic forces acting on the blades; to oppose a controlled centrifugal force to the aerodynamic and centrifugal forces inherent in the functioning of the blade, thus maintaining the most effective pitch setting under varying conditions of operation; to provide means whereby the blades will turn to the "feathered" position on stoppage of the engine, thus reducing drag and air turbulence over wings or like surfaces; to provide means whereby the forward thrust developed by the airscrew may be at maximum for the take off of an aircraft; to obtain the greatest thrust available at various altitudes under varying aerodynamic pressures; to avoid injurious racing during power dives; and generally to contribute to the increased efficiency of aircraft.

According to the invention there is provided an airscrew blade pitch controlling mechanism having centrifugal mass regulating means wherein the effective magnitude of the mass is varied in response to the variations of rotational speeds.

In an acceptable form described herein the blades of an airscrew are operatively connected to a centrifugal mass, which is adapted to be varied in effective magnitude in accordance with pitch setting. Preferably the mass, which may comprise a plurality of weights disposed about the airscrew axis, tends to move radially outwards from the airscrew, and tends to increase the pitch of the blades from a minimum position, and as the blades so move, effective magnitude of the mass of the weight or weights as centrifugal mass, is decreased. The centrifugal mass may conveniently comprise weights carried on diametrically opposite rods extending radially from the airscrew axis, and operatively connected to the blades, as for example by being provided with racks engaging pinions. Further, the effective magnitude of the mass may be varied by providing a plurality of weights on each rod, which weights are capable of sliding thereon, whilst a series of convenient stops are provided at predetermined distances, whereby after the rods have moved outwards a certain distance the innermost sliding weight on each rod is prevented from further movement and therefore becomes ineffective, and after further movement the second weights are likewise stopped, and so on until the rods alone remain as the effective centrifugal mass. It will be understood that the blades are preferably of such a type that they tend to change their pitch on rotation of the airscrew. Such tendency may be due to aerodynamic, centrifugal, or like forces acting on the blades. In the preferred form of the invention these forces tend to decrease the pitch of the blades, whilst as before stated the centrifugal weights tend to increase the pitch, and it will be understood that an equilibrium between the two tendencies will result in a pitch setting.

Referring to the drawing, Figure 1 is a fore and aft vertical section of the hub and roots of an airscrew mounted on the drive shaft.

Figure 2 is a vertical cross section of the airscrew hub shown in Figure 1.

Figure 3 is a horizontal section on the line 3—3 of Figure 1.

Figure 4 is a detail of one of the toothed rack yokes.

Figure 5 is an end view of the tooth rack yoke illustrated in Figure 4.

Figure 6 is a diagrammatic showing of the device and showing the mechanical application.

Figure 7 is a diagram illustrating the setting of the blades and its axis.

Like numerals of reference indicate corresponding parts in the various figures.

The airscrew hub comprises a split casing 15 one side of which carries a sleeve 16 into which is fitted the tapered end 17 of the airscrew shaft 18 which is suitably driven. A key 19 rigidly secures the hub casing 15 on the airscrew shaft, and is held in place by the washer and nut 20, while the plug cap 21 assists in holding the split casing together.

The casing 15 has the oppositely disposed extensions 22 and 23 forming housings for blade root retaining mechanism and for the setting of the automatic operating mechanism to be described hereinafter.

The sleeve 16 forms a journal bearing for the spur gears 24 and 25 which are integral with the bevel gears 26 and 27 respectively. The teeth on the spur gears 24 and 25 are preferably of the herringbone type. Suitable ball races 28 support the bevel gears 26 and 27 on the faces of the casing 15.

The pitch controlling mechanism extending outwards from the hub center into the extension 22 is identical with the mechanism in the extension 23, and will be described in detail, the numerals identifying the various parts of the mechanism included in the extension 22 identifying equivalent parts in the mechanism included in the extension 23.

The bevel gears 30 mesh with the teeth of the bevel gears 26 and 27 and have the sleeve 31 journalled in the extension 22 and supported therein on the inwardly projecting lip 32 and runs on the ball race 33, and is internally threaded at 34 to receive the blade locking split collar 35 which is provided with annular square cut grooves providing rings 36 meshing with similar cut grooves in the blade root 37 of the blade 38.

The blade 38 contains a prepared space in the root to receive the sleeve 39 which is flanged at 40 to fit into the recess 41 in the face of the bevel gear 29. This sleeve is a tight fit in the blade and provides a housing for the weight spacers 42 which are in the form of sleeves having inwardly projecting lips 43 providing stops for the weights 44. These weights are recessed at one end to overlap the lips 43 and are of equal length while the weight spacers are slightly longer than the weights. The weights 44 are centrally bored to receive the rod 45 which is integral with the outer weight 46 which has a greater range of movement than any of the weights 44.

A plug 47 is screwed into the flanged end of the sleeve 39 to limit the fall of weights and weight spacers in the idle position of the airscrew.

A forked yoke 48 is mounted on the inner end of the rod 45 and has its arms 49 and 50 offset from the vertical center line as shown in Figure 5 of the drawing, and have the teeth 51 forming racks engaging the spur gear 24 on one side and engaging the spur gear 25 on the opposite side so that through rotation of the spur gears the bevel wheels 26 and 27 are rotated in opposite directions.

The mechanism on the opposite side is the same as that above described and the yokes and racks combine with the spur gears to give opposite rotation to the airscrew blades which are rigidly mounted with the bevel gears 29 and 30.

In the operation of this invention, the weight 44 and 46 with the rod 45 are proportioned in respect to the specific combination of aeroplane, engine and type of airscrew blades selected as are also the weight spacers, which limit the travel of the weights 44. Of these weights the innermost has the least travel, and each successive weight has more travel than the one immediately next to it on the inner side, while the yoke, and the yoke rod 45, with the weight 46 are allowed more travel than any of the weights 44.

The movement of the yokes, and the rotation of the blades bear a fixed relation to each other, so that if the yokes move say ⅛" the blades must rotate through a definite angle in degrees and minutes regardless of the setting from which they start.

The outward limits of the weights 44 are as follows:—

All the weights are allowed to travel with the weight 46, the rod 45, and the yoke from the position corresponding to "no pitch" to that corresponding to the pitch assumed at the beginning of the take-off run. The innermost weight can travel outward no further, but the rest of the assembly can move on outwards leaving behind the weights 44 successively until at the position corresponding to the pitch assumed at the maximum speed of the aeroplane, the outermost of the weights 44 has just been separated from the weight 46.

The yoke, yoke rod, and weight 46 can still move on outward, unaccompanied, till the position corresponding to "infinite pitch" or the "feathered position" is reached.

Referring particularly to Figure 7 in the drawing and looking at the tip of one blade in line with its axis, A. B. represents the blade, A the leading edge, and B the trailing edge, F is the center of pressure and X is the axis about which the blade turns. T is the thrust on the blade and C is the centrifugal force exerted through the blade root bevel rings 24 and 25. The blade is so mounted that the axis X about which it rotates lies at all times between the center of pressure F and the leading edge A, so that the blade always tends to offer its leading edge to the airstream, in fact to "feather". One consequence of this arrangement is that in the event of engine stoppage from any cause the thrust T will be reversed, assisting the force C in turning the blades to the "feathered" position. This position being achieved, turbulence over the wing surface and consequence loss of efficiency will be minimized and the drag of turning a dead engine avoided.

Neglecting for the moment the sliding weights, it will be seen that at a constant propeller speed R. P. M. there will be a corresponding constant value for the force C, producing a constant moment about X. This will be opposed by an opposite moment of T about the same point, which will bring the blade A. B. into equilibrium at whatever pitch is required to produce the necessary value of T.

The force C bears a constant relation at all times to the centrifugal pull on the yokes. The blade will keep itself automatically at the pitch required to give the highest thrust torque ratio possible, for if equilibrium is once established at this point, any increase in pitch at a given air speed would result in greater thrust and even greater drag against the engine, thereby immediately reducing the R. P. M. and restoring the equilibrium by reducing the value of C.

As the air speed increases, other things being equal, the pitch required to maintain the constant thrust must increase, as otherwise the angles of attack along the blade will decrease.

The yoke rods 45 with their integral weights 46 together with the yokes 48 tend to fly outwards, as the airscrew revolves, under the action of centrifugal force. This centrifugal force tends, through the mechanism as described to increase or "coarsen" the angles of attack along the blades. The blades are so mounted that they tend, owing to aerodynamic thrust, to decrease the angles of attack. These two forces, therefore, are pulling against each other. A small change of the angles of attack will produce a relatively great change in thrust, and consequently in the moment tending to decrease the angles of attack. But the same change will make very little different to the centrifugal pull in the opposite sence. Consequently the device will reach equilibrium at a certain value of these angles of attack along the blades, and if the weights and proportions in the yoke rod assemblies are suitably selected, these angles of attack at equilibrium of the device will correspond to the maximum efficiency of which the blades are capable.

During the take-off run however, when the air speed is much lower, the device would only allow the same thrust at the same R. P. M., whereas in practice a much greater thrust can be obtained during the take-off run than is possible in full flight, even if the engine is developing the same power. As a greater thrust is available at a lower airspeed, it follows that if the pitch can adjust itself to retain an equal thrust at equal R. P. M., the engine will speed up until the same power is absorbed.

This is undesirable, as with a perfect airscrew cruising power should always produce cruising R. P. M., and maximum power produce maximum R. P. M.

To attain this result it is necessary to apply greater centrifugal pull to balance this greater thrust at low air speed.

During this period when greater thrust is available, however, the pitch of the blades (as distinct from the angles of attack along them) will be considerably less than at cruising speed. This fact is exemplified in cases where fixed pitch airscrews are at or near the stalling point at commencement of take-off run.

When the yoke is nearest to the center the blades are in the minimum pitch position. The centrifugal forces exerted by the sliding weights are all taken on weighted ends 46 of the rods and applied to increase C and consequently the thrust.

Referring to the sliding weights, and weight spacers, the weights and weight spacers are so proportioned that at commencement of the take-off run when maximum thrust is desired, and when pitch is at a minimum the whole centrifugal throw of the sliding weights contributes to the pull of the yokes, thus balancing the greater thrust desired. As the machine accelerates, the pitch increases, and the maximum available thrust decreases. The weight spacers are of such length that they engage with the sliding weights one by one starting from the innermost, and transfer the centrifugal pull of these weights from the yoke rods to the walls of the guide or containing tube until by the time cruising airspeed is attained all the sliding weights have been so transferred.

As the yokes travel out the sliding weights are left behind one after another on the stops, until finally only the weighted rods and yokes are exerting pull against the thrust. The weights can of course be made of any desired values and the same applies to the intervals of yoke travel at which the stops pick up the weights.

The centrifugal pull increases, of course, directly as the square of the R. P. M. of the airscrew $$\frac{WV^2}{2GR},$$

(W equals the weight in pounds, V equals rotational velocity in feet per second, G equals the acceleration due to gravity—equals 32.2 feet per second, and R equals the radius in feet), variations in R being negligible from this point of view. As the air resistance also increases approximately as the square of the speed, the thrust will increase in approximately the same ratio, and it therefore follows that there will not be any great change in the angle of attack as the result of the increased airscrew speed. It also follows that the torque resistance, or drag will increase in the same ratio.

By taking advantage of this flexibility the thrust for a constant airscrew speed (R. P. M.) can be made to decrease as the pitch increases by almost any number of weights and graduations of stops.

What I claim is:—

1. In an airscrew, a hub casing, blades having an axial bore rotatively mounted in said hub casing, a blade pitch controlling mechanism comprising rods sliding in the bore of said blades, a series of weights slidable on said rods, means for progressively intercepting said weights to vary the total effective centrifugal mass of the weights and rods, and means to convert the movement of said weights and rods under certifugal force into rotary movement of the airscrew blades about their axes in equilibrating relation with the aerodynamic forces acting on the blades.

2. In an airscrew, a hub casing, blades having an axial bore rotatively mounted in said hub casing, a blade pitch controlling mechanism comprising rods sliding in the bore of said blades, a series of weights slidable on said rods, means for progressively intercepting said weights at successive predetermined intervals of travel to vary the total effective centrifugal mass of the weights and rods, and means to convert the movement of said weights and rods under centrifugal force into rotary movement of the airscrew blades about their axes in equilibrating relation with the aerodynamic forces acting on the blades.

3. In an airscrew pitch controlling mechanism, a driven shaft, a hub casing, blades rotatively set in said hub casing, a centrifugal regulator for said blades comprising rods radiating from the axis of the airscrew and slidable in said blades, a plurality of weights slidable on said rods, fixed stops for progressively intercepting said weights at successive predetermined intervals of travel to vary the total effective centrifugal mass of the rods and weights, and means to convert the movement of said rods and weights under centrifugal force to rotary movement of the airscrew blades about their axes in equilibrating relation with the aerodynamic forces acting on the blades.

4. In an airscrew pitch controlling mechanism, a driven shaft, a hub casing, blades rotatively set in said hub casing, a centrifugal regulator for said blades comprising rods radiating from the axis of the airscrew and slidable in said blades, a plurality of weights slidable on said rods and co-operatively adding to the centrifugal mass of the rods, fixed stops successively intercepting said weights to vary the total effective centrifugal mass of the rods at predetermined intervals of travel of the weights, and means to convert the movement of said rods and weights under centrifugal force to rotary movement of the airscrew blades about their axes in equilibrating relation with the aerodynamic forces acting on the blades.

5. In an airscrew pitch controlling mechanism, a driven shaft, a hub casing, blades rotatively mounted in said hub casing, a centrifugal regulator for said blades comprising rods radiating from the axis of the airscrew and slidable in said blades, a plurality of weights slidable on said rods to co-operatively increase the centrifugal mass of the rods, fixed stops successively intercepting said weights to vary the total effective mass of the rods at predetermined intervals of travel of the weights, and gearing between the rods and the airscrew blades to rotate the blades about their axes coincidentally with the movement of said rods and weights operated by centrifugal force in equiliberating relation with the aerodynamic forces acting on the blades.

6. In an airscrew pitch controlling mechanism, a driven shaft, a hub casing, blades rotatively mounted in said hub casing, said blades being bored axially from the blade root, a centrifugal regulator for said blades comprising rods radiating from the axis of the airscrew and movable within the axial bore of the blades, a plurality of weights slidable on said rods to co-operatively increase the centrifugal mass of the rods, fixed stops successively intercepting said weights to vary the total effective mass of the rods at progressive predetermined intervals of travel of the weights, and gearing between the rods and the airscrew blades to rotate the blades about their axes coincidentally with the movement of the rods and weights operated by centrifugal force in equiliberating relation with the aerodynamic forces acting on the blades.

7. In an airscrew pitch controlling mechanism, an airscrew hub having radiating extensions, air screw blades rotatively mounted in said hub extensions, said blades being bored axially from the blade roots, fixed stops spaced at predetermined intervals along the axial bore of said blades, rods radiating from the axis of the airscrew and movable in the axial bore of the blades, a plurality of weights slidable on said rods to co-operatively increase the centrifugal mass of the rods, said weights having individually limited travel between the fixed stops to vary the total effective mass of the rods, and means to convert the movement of said rods and weights under centrifugal force to rotary movement of the blades about their axes in equilibrating relation with the aerodynamic forces acting on the blades.

8. In an airscrew pitch controlling mechanism, a driven shaft, a hub casing mounted on said shaft, blade root housing extensions radiating from said casing, blades rotatively mounted in said extensions, a bevel gear mounted on the root of each blade, a pair of spur gears journalled on said shaft, bevel gears integral with said spur gears and meshing with the first mentioned bevel gears, offset yoke racks engaging with said spur gears and extending to radial rods forming weight carriers, stops progressively set at various positions adjacent said radial arms, weights slidably mounted on said radial rods and automatically adjusting themselves on said stops to vary the effective centrifugal mass of the rods, the movement of said rods under the action of centrifugal force being converted through said spur and bevel gears to rotative movement of the blades to alter their pitch setting in equilibrating relation with the aerodynamic forces acting on the blades.

9. In an airscrew pitch controlling mechanism, a driven shaft, a hub casing having a central sleeve keyed to said shaft, blade root housings extending radially from said hub casing, a pair of spur gears journalled on said sleeve, bevel gears integral with each of said spur gears, offset yoke racks engaging with said spur gears, propeller blades journalled in said housings, each blade having an axial bore, weight carrier rods sliding in the bore of said blades and connected to said yoke racks at their inner ends, fixed stops progressively spaced in the bore of said blades adjacent said rods throughout their length, weights slidably mounted on said rods and automatically adjusting themselves against said stops to limit the centrifugal mass of the weights on the rods at various set positions, and bevel gears rigidly attached to said blades and engaging said first mentioned bevel gears, adapted on rotation of the gears by the racks to alter the pitch setting of the blades in equilibrating relation with the aerodynamic forces acting on the blades.

10. In an airscrew pitch controlling mechanism, a driven shaft, a hub casing having a central sleeve keyed to said shaft, blade root housings extending radially from said hub casing, a pair of spur gears journalled on said sleeve, bevel gears integral with each of said spur gears, offset yoke racks engaging said spur gears, blades journalled in said housings, each blade having an axial bore, weight carrier rods sliding in the bore of each blade and connected to said yoke racks at their inner ends, weights slidably mounted on said rods and automatically adjusting themselves under the action of centrifugal force, weight spacers fitted in the axial bore of said blades and spacing said weights at increasing distances outwardly, said weights and rods pulling said yoke racks and thereby rotating said spur gears, and bevel gears rigidly attached to said blades and engaging with said first mentioned bevel gears for rotative movement of the blades about their axes operated by said rods and weights in equilibrating relation with the aerodynamic forces acting on the blades.

11. In an airscrew pitch controlling mechanism, a driven shaft, a hub casing having a central sleeve keyed to said shaft, blade root housings extending radially from said hub casing, sleeves journalled in said housings and carrying ring bevel gears at their inner ends, blades fixedly mounted in said sleeves and rotatable therewith, each blade having an axial bore, stops spaced in the bore of each blade at progressively greater intervals outwardly, a pair of spur gears rotatively mounted on said central sleeve, a bevel gear integral with each of said spur gears and meshing with the ring bevel gears, weighted rods sliding in the bore of each blade and terminating at their inner ends in a pair of offset yoke racks, one yoke rack of each pair engaging on opposite sides with each of said spur gears, weights sliding on said rods and spaced from each other by said stops to vary the total effective centrifugal mass of the rods, the movement of said rods under the action of centrifugal force being converted through said yoke racks and spur and bevel gears to rotative movement of the blades to alter their pitch setting in equilibrating relation with the aerodynamic forces acting on the blades.

12. In an airscrew pitch controlling mechanism, a driven shaft, a hub casing having a central sleeve keyed to said shaft, blade root housings extending radially from said hub casing, sleeves journalled in said housings and carrying ring bevel gears at their inner ends, blades fixedly mounted in said sleeves and rotatable therewith, each blade having an axial bore, stops spaced in the bore of each blade at progressively greater intervals outwardly, a pair of spur gears rotatively mounted on said central sleeve, a bevel gear integral with each of said spur gears and meshing with the ring bevel gears, weighted rods sliding in the bore of each blade and terminating at their inner ends in a pair of offset yoke racks, said racks being offset from the centre line of the rods to engage with each of said spur gears on opposite sides to reverse their rotation on movement of the racks, weights sliding on said rods and spaced from each other by said stops to vary the total effective centrifugal mass of the rods, the movement of the rods under the action of centrifugal force being converted through said yoke racks and spur and bevel gears to rotative movement of the blades to alter their pitch setting in equilibrating relation with the aerodynamic forces acting on the blades.

13. In an airscrew pitch controlling mechanism, a driven shaft, a hub casing having a central sleeve keyed to said shaft, oppositely disposed propeller plades journalled in said casing and terminating at their inner end in ring bevel gears, spur gears journalled on said central sleeve, bevel gears integral with said spur gears and meshing with the ring bevel gears, weighted rods having each a pair of racks at its inner end, each pair of racks being offset to engage with each of said spur gears on opposite sides, weights sliding on said rods and having variable and limited travel to adjust and vary the total effective centrifugal mass of the rods, the outward movement of said rods under the action of centrifugal force rotating said gears and consequently said blades to alter their pitch setting in equilibrating relation with the aerodynamic forces acting on the blades.

14. In an airscrew, a hub casing, blades rotatively mounted in said hub casing, a drive shaft supporting said hub casing for rotative movement, a set of gears synchronously connecting said blades, a series of weights subject to radial movement outwardly under the action of centrifugal force on rotation of the drive shaft, said weights being operatively connected with said gears, and means to progressively render ineffective each of said weights in succession to vary the total effective centrifugal mass and through the movement of said weights effect rotation of said gears and thereby rotate the blades about their axes to alter their pitch setting in equilibrating relation with the aerodynamic forces acting on the blades.

GRETTIR ALGARSSON.